United States Patent [19]

Callier et al.

[11] Patent Number: 4,967,333
[45] Date of Patent: Oct. 30, 1990

[54] STABILIZED POWER SUPPLY WITH REDUCED RIPPLE FACTOR

[75] Inventors: Bernard Callier; Jean-Pierre Maynard, both of Voisins le Bretonneux, France

[73] Assignee: General Electric CGR S.A., Issy les Moulineaux, France

[21] Appl. No.: 365,366

[22] Filed: Jun. 13, 1989

[30] Foreign Application Priority Data

Jun. 17, 1988 [FR] France ................. 88 08112

[51] Int. Cl.$^5$ .................. H02M 3/335; H02M 5/458
[52] U.S. Cl. ............................... 363/17; 363/17; 363/37; 363/61; 363/72; 378/104; 378/112
[58] Field of Search .............. 363/17, 27, 28, 37, 363/61, 72, 68, 2, 3; 378/111, 112, 104, 101

[56] References Cited

U.S. PATENT DOCUMENTS

| | | | |
|---|---|---|---|
| 3,697,717 | 10/1972 | Kornrumpf et al. | 219/10.49 |
| 4,216,382 | 8/1980 | Franke | 378/111 |
| 4,317,039 | 2/1982 | Romandi | 378/101 |
| 4,504,985 | 3/1985 | Steigerwald | 363/17 |
| 4,652,985 | 3/1987 | Bougle | 363/28 |

FOREIGN PATENT DOCUMENTS 1300664  3/1987 U.S.S.R. .................. 378/101
8604749  8/1986 World Int. Prop. O. .

OTHER PUBLICATIONS

Patent Abstracts of Japan vol. 7, No. 247 (E-208 1392, Nov. 2, 1983, & JP-A-58 133170 (Matsushita Denko K.K.) 08-08-83.

Primary Examiner—William H. Beha, Jr.
Attorney, Agent, or Firm—Oblon, Spivak, McClelland, Maier & Neustadt

[57] ABSTRACT

The ripple factor in an electrical power supply of a dc-dc voltage raising type is reduced by using two double alternation dc/ac converters driven in phase quadrature with respect to each other. The signals delivered by the dc/ac converters are then combined by two transformers, the secondary coils of which are series connected. It is shown that the ripple factor is reduced and, similarly, that the reactive energy due to the commutation of th dc/ac converters is reduced even if it so happens that the power transmitted is doubled.

5 Claims, 2 Drawing Sheets

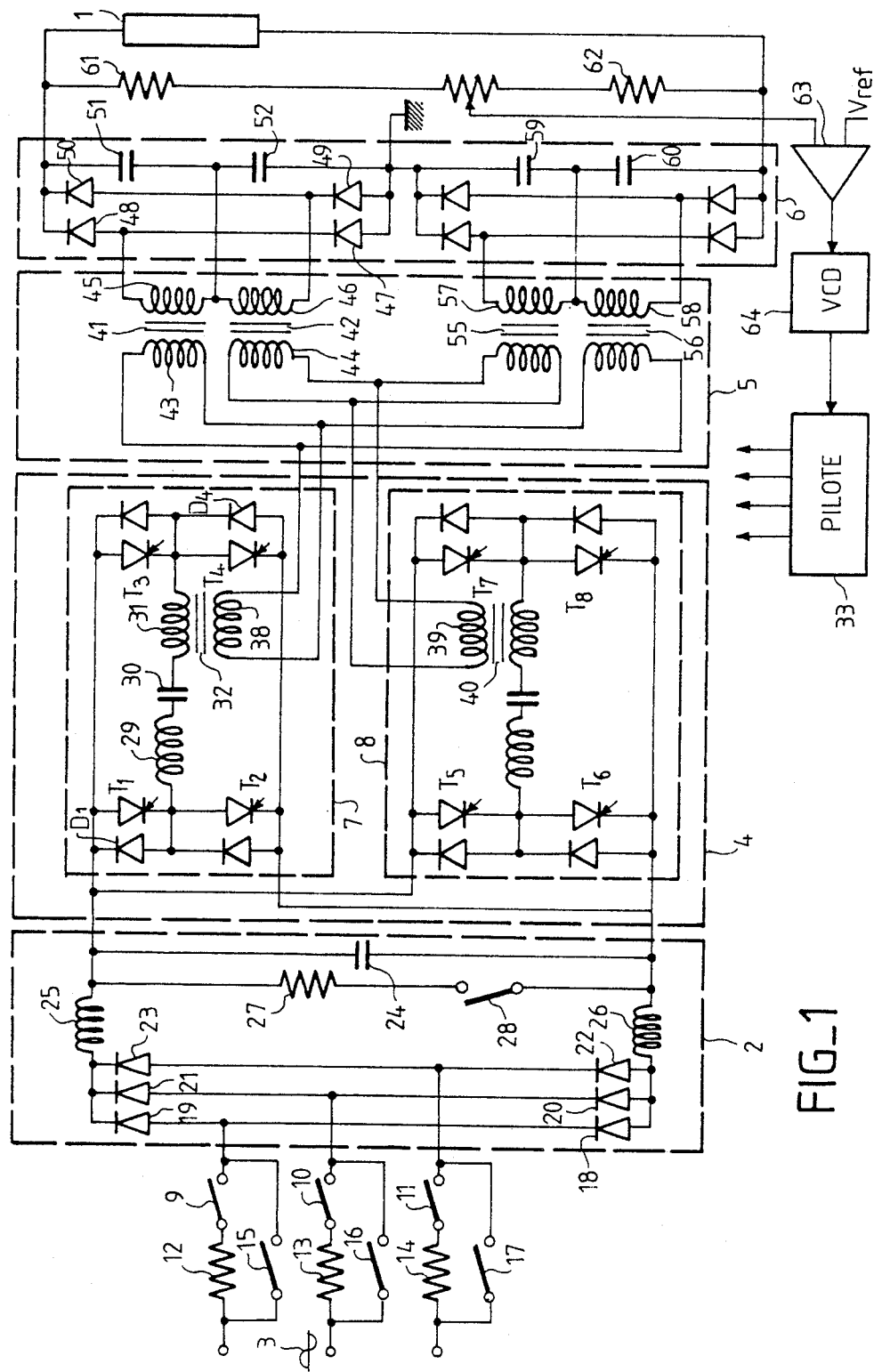
FIG_1

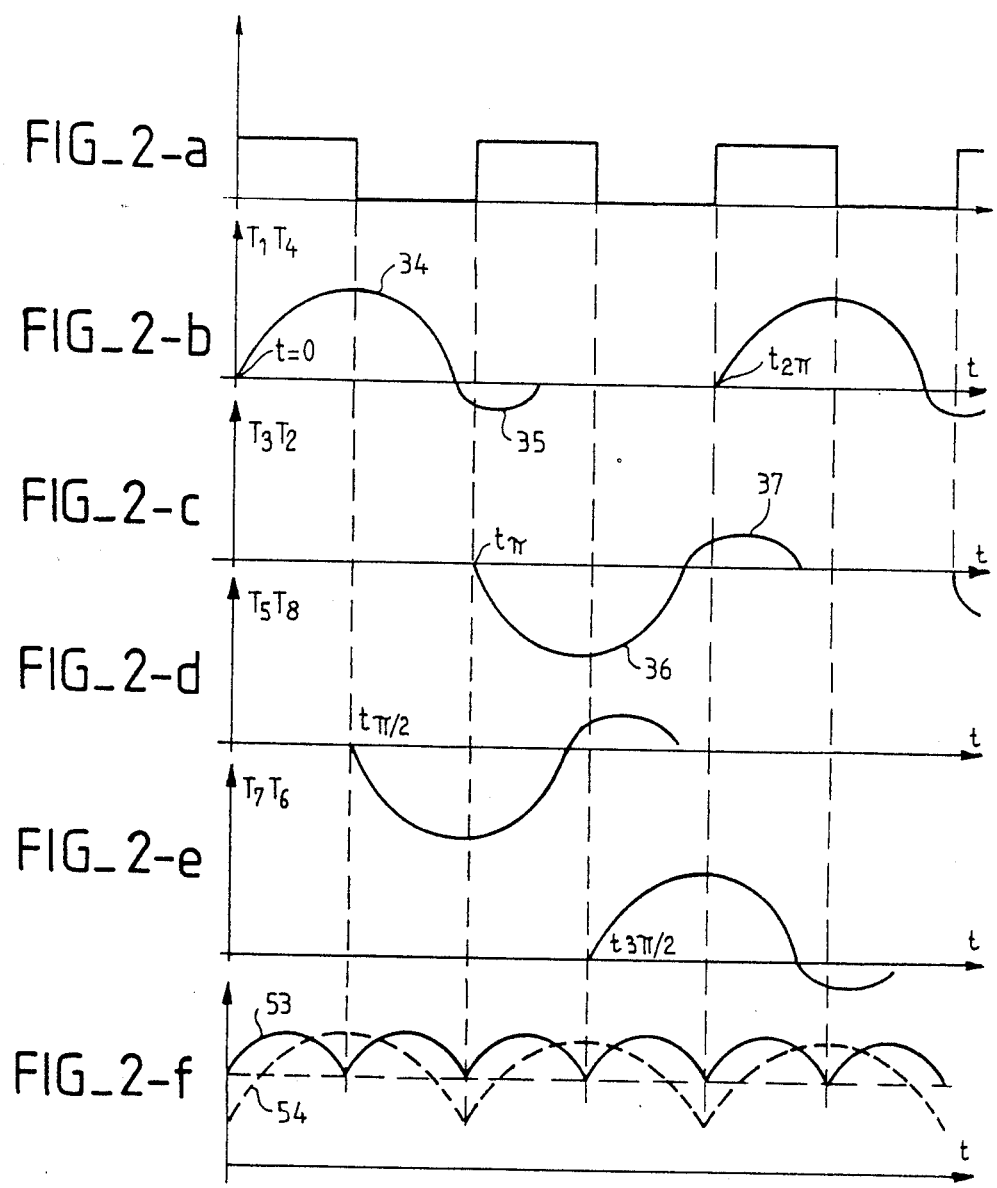

STABILIZED POWER SUPPLY WITH REDUCED RIPPLE FACTOR

BACKGROUND OF THE INVENTION

1. Field of the Invention

An object of the present invention is a stabilized power supply, with reduced ripple factor, which can be used especially in medicine to provide electrical power to X-ray tubes. However, it can be also applied in other fields where there is a need for high levels of electrical power, for example of up to 100 kilowatts (KW) and very high voltages, for example of up to 100 kilovolts (KV). The invention relates mainly to dc-dc type voltage elevation power supplies provided with an dc-ac converter.

2. Description of the Prior Art

A voltage rise power supply of the dc/dc type generally has a first rectifier which can be connected with an electrical mains supply. The rectified and filtered voltage given by this rectifier is introduced into a variable frequency dc-ac converter which gives a converted signal. The converted signal is then applied to a voltage-raising transformer which is itself connected with a second rectifier to produce a rectified high voltage. A rectified high voltage of this type can be used, for example, to control an X-ray tube by giving the necessary potential difference between the cathode and the anode of this tube. The high voltage given is generally controlled by causing the ripple frequency of the dc-ac converter to vary so as to affect its power transfer function according to the frequency. Despite all the precautions that may be taken, especially in choosing high capacitance filtering cells in the second rectifier or in choosing a high ripple frequency for the dc-ac converter, the persistence of ripples in the high voltage delivered is noted during use. The frequency of these ripples follows the frequency of the dc-ac converter. Besides, these ripples in the high voltage delivered are all the more sensitive as the power capable of being consumed by the tube is great. The problem therefore arises more especially with high power applications.

A problem of this type arises, for example, when there is a dc/dc power supply of this type working at a given power, for example 50 KW, and it is sought to put a new power supply into industrial use which is twice or three times or even n times the power of this existing supply. The method used lies in developing a new power supply wherein the characteristics of all the components would be doubled, tripled or multiplied by n but this method is not practicable in industrial conditions because the dispersal of the characteristics of the electronic components used is such that numerous problems arise in creating the system. The result of these problems is that this approach, which is simple in principle, cannot easily provide a solution. Lengthy, expensive research and design work is needed to achieve this goal.

Furthermore, the use of dc/ac converters in voltage-raising power supplies of the dc/dc type does have unwanted effects on the electrical lines. In particular, the reinjection, into the mains system, of reactive energy due to commutation in the dc-ac converter is quite simply doubled, tripled or multiplied by n when the power thus produced is doubled, tripled or multiplied by n times. To prevent this reinjection, it becomes necessary to place very powerful, hence very bulky and very expensive filters in the filtering circuit of the first rectifier. The cost of these filters increases with the power used.

It is an object of the invention to cope with these disadvantages by proposing a method which, at multiple power values, uses exactly those already tested industrial methods wherein the ripple factor of the high voltage at the terminals of the load, and hence the reactive energy reinserted into the mains, is considerably reduced. In practice, a reduction in a ratio of 4 is obtained. The principle of the invention lies in the use of two, three or n identical dc/ac converters parallel connected to the output of the first rectifier, the triggering of said dc/ac converters being phase shifted with respect to one another, in phase quadrature, with a phase shift of $2\pi/3$ or with a phase shift of $2\pi/n$. It can then be shown that each dc-ac converter can provide a fraction $P/n$ of the total power $P$ to be transmitted.

It is then easier to control the characteristics of the usable passive and active components, taking into account the operating frequencies, if these characteristics are not already known. In particular, it becomes possible, with smaller components of this type, to work at ripple frequencies which are themselves higher. Thus, in a preferred example, using two double alternation dc/ac converters, phase-shifted in quadrature, a ripple equivalent to a four-peak rectification (the ripple frequency on the load is four times the frequency of the dc-ac converter) is obtained at the terminals of the X-ray tubes. Thus, for a natural operating frequency of a given dc-ac converter, we get a high voltage ripple reduced by at least half as compared with a generator comprising a single dc-ac converter working at the same natural frequency. Furthermore, in this type of operation, the reactive current that flows through the filter of the first rectifier, is reduced in a ratio of 4 for the rated power of the instrument. Here again, a considerable gain is obtained in the sizing of the filtering capacitances.

The structure of a high voltage unit should further provide perfect balancing between a positive channel and a negative channel. Since it is unlikely that, despite all the precautions taken, both the dc/ac converters or all the small n dc/ac converters thus put into operation have equal transfer characteristics, in one improvement, the contribution of each of these dc/ac converters to the positive channel on the one hand and to the negative channel on the other hand is shared. In this improvement, the connection of the voltage raising circuit of the dc-ac converter circuit output voltage is then slightly more complicated to enable, through the use of already tested voltage raising transformers, a balancing between the channels. This balancing is independent of the characteristics of the dc/ac converters and, for each dc-ac converter, when they are double alternation dc/ac converters between one alternation and another.

SUMMARY OF THE INVENTION

An object of the invention therefore is a stabilized power supply with a reduced ripple factor, especially for X-ray tubes, comprising :

a first rectifier which can be connected to an electrical mains supply, a converter circuit to convert a dc signal delivered by the first rectifier into an ac signal, said converter circuit comprising n dc/ac converter units, working at one and the same frequency and triggered with respect to each other substantially with a phase shift of $2\pi/n$, a circuit to raise the voltage of the ac signals produced by the dc/ac converter circuit, and a second circuit to rectify the ac signals whose voltages are thus raised, wherein the voltage raising circuit comprises 2n transformers being divided into a first and a second group of, each, n transformers, the primary winding of each transformer of the first group being connected in parallel with the primary winding of a corresponding transformer of the second group to the output of a dc/ac converter unit, the secondary windings of all the transformers of each group are series connected to the input of one of two second rectifiers, and wherein the two second rectifiers are series connected with each other.

In one improvement, the dc/ac converters are of the double alternation type and the phase shifts are consequently equal to $\pi/n$.

DESCRIPTION OF THE DRAWINGS

The invention will be better understood from the following description and the accompanying figures. These figures are given only by way of indication and in no way restrict the scope of the invention. Of these figures:

FIG. 1 is a block diagram of a stabilized supply according to the invention;

FIGS. 2a to 2f are timing diagrams of control signals that come into play in the control of the power supply according to the invention.

DESCRIPTION OF A PREFERRED EMBODIMENT

FIG. 1 shows a stabilized power supply with a reduced ripple factor according to the invention. This supply is designed especially to power an X-ray tube 1 which can be used in a medical application. This supply essentially comprises a first rectifier 2 connected to an electrical mains system 3. An dc-ac converter circuit 4 is used to convert a rectified and filtered dc voltage given by the first rectifier 2 into an ac voltage. A voltage raising circuit 5 raises the voltage of the signal given by the dc/ac converter circuit. The circuit 5 is connected to a second rectifier 6 designed to produce a high dc voltage from a high ac voltage given by the raising circuit 5. An essential feature of the invention lies in the fact that the circuit to convert the dc signal given by the first rectifier into an ac signal has n dc/ac converters (here n=2). Thus the circuit 4 comprises the dc/ac converters 7 and 8 respectively. In the example shown, these dc/ac converters 7 and 8 are of the double alternation type, and each of them has two sets of switches to make the current flow alternately in one direction and then another in a resonant circuit.

The power supply according to the invention works as follows. At the instant when the installation becomes powered, a set of switches 9 to 11 is commutated so as to connect the rectifier 2 to the electrical mains 3 by means of series-mounted resistors 12 to 14 respectively. The presence of the resistors 12 to 14 is warranted by the high power nature of the supply to be achieved and by the need to limit the build-up call current when starting up the system in the mains. The resistors 12 to 14 are used only to precharge the downline filter capacitors. They are used only when the converters are turned on. These converters provide for the rise in the high voltage. The resistors 12 to 14, along with the filtering capacitors of the rectifier 2 act as a low-pass circuit. The build-up current does not rise too suddenly. When this build-up current is sufficient, a second set 15 to 17 of switches in parallel with the resistors 12 to 14, in series with the switches 9 to respectively, is closed so as to subsequently eliminate energy losses in the resistors 12 to 14. This build-up time or rising time is about a few milliseconds.

The alternating signal given by the mains 3 is thus applied to the input of a standard rectifier 2 with diodes 18 to 23. The rectifier with diodes delivers a rectified voltage into a filtering cell which essentially comprises a filtering capacitor 24 and two chokes 25 and 26. The capacitor 24 is series-connected between the chokes 25 and 26, and the entire assembly is parallel connected to the rectifier with diodes. A voltage rectified and filtered in this way is then available at the terminals of the capacitor 24. A resistor 27 in series with a switch 28 is also placed in parallel on the capacitor 24. At the instant when the electrical power is cut off from the installation, the closing of the switch 28 (after the reopening of the switches 9 to 11 and 15 to 17) quickly discharges the capacitor 24 into the resistor 27 so as to prevent any prolonged wait for a discharge, through leakage current, of the capacitor 24 through the diodes 19 to 22.

According to the invention, the dc/ac converter circuit has n dc/ac converters and, in this example, we shall describe a preferred approach with two dc/ac converters 7 and 8. Each dc/ac converter is connected, at its input, in parallel with the output of the first rectifier 2. The two dc/ac converters are similar. For example, the dc/ac converter 7 has two sets of thyristors, respectively $T_1$, $T_4$ and $T_3$, $T_2$. Each set of thyristors is series connected on either side of a resonant circuit comprising a choke 29, a capacitor 30 and a primary winding 31 of a transformer 32.

Referring to FIGS. 2a to 2c, this dc/ac converter works as follows. At an instant t=0, the triggers of the thyristors $T_1$ and $T_4$ are released by a command emitted by a driving circuit 33. The current then flows into the thyristor $T_l$, the choke 29, the capacitor 30 and the primary winding of the transformer 31 and then loops back by the thyristor $T_4$ at the output of the rectifier 2. A positive alternation 34 then arises in the resonant circuit 29 to 31. By resonance, this alternation gives rise to a reactive negative alternation 35. The reactive alternation current 35 is reinjected into the rectifier 2 by means of two diodes, $D_4$ and $D_1$ respectively, parallel connected on the thyristors $T_4$ and $T_1$. The diodes $D_1$ and $D_4$, which allow the reactive alternating current to flow through, enable the thyristors $T_1$ and $T_4$ to be off until their next triggering. At an instant $t\pi$ (FIG. 2c), very shortly after the start of the reactive alternation 35, the driving circuit 33 triggers the set of thyristors $T_3$ and $T_2$ which also, for their part, tend to cause a charging current to flow (albeit in the reverse direction) in the resonant circuit 29 to 31. The thyristors $T_3$ and $T_2$ then give rise to a negative alternation 36 which combines with the alternation 35. The alternation 36 gives rise, in the same way as the alternation 34, to a reactive alternation 37. The result of this is that the current flowing through the oscillating circuit 29 to 31 is then substantially sinusoidal and that this current can then be raised in the transformer 32, so as to be available at the secondary winding 38 of this transformer 32. At the end of a period $T_{2\pi}$ (fig.2b), the phenomenon described is repeated under the control of the circuit 33.

The dc/ac converter 8 is comparable in all respects to the dc/ac converter 7, except that the triggering of its thyristors $T_5$, $T_8$ or $T_7$, $T_6$ is caused in phase quadrature at instants $t\pi/2$ or $t3\pi/2$, as compared with the instants at which the triggering of the thyristors $T_1$ $T_4$ and $T_3$ $T_2$ is caused. The result of this is that the secondary winding 39 of the transformer 40 of the resonant circuit of the dc/ac converter 8 gives a signal, also sinusoidal, but phase shifted in quadrature with respect to the signal given by the secondary winding 38. This feature can be easily generalised to a case where there are n dc/ac converters. In this case, the signals given by these dc/ac converters would be phase shifted by $2\pi/n$, or more precisely, by $\pi/n$ with double alternation dc/ac converters as in this case.

The signals available at the secondary windings 38 and 39 are then sent to a raising circuit 5 which comprises, according to one alternative embodiment, two transformers 41 and 42. The two primary windings, 43 and 44 respectively, of these transformers 41 and 42 are connected to the secondary windings, 38 and 39 respectively. The secondary windings, 45 and 46 respectively, of the transformers 41 and 42 are series connected with each other and supply a second rectifier circuit with diodes 47 to 50 of the same type as the first rectifier 2. This second rectifier is connected in parallel to two series connected capacitors 51 and 52. To balance the assembly, the mid-point of the capacitors 51 and 52 is even connected to the mid-point of the secondary windings 45 and 46. Other alternatives are possible.

Independently to other improvements which shall be seen further below, this combination of signals in phase quadrature in two transformers 41, 42 with series connected secondary windings, or in a single transformer with n primary windings, has the effect of giving a rectified signal with n times more peaks than would be the case if there were only one dc/ac converter. FIG. 2f shows a comparison between the ripples 53 obtained after the rectification of a signal according to the invention and the less frequent but far bigger ripples 54 obtained when there is only one dc/ac converter.

The reduction in the amplitudes of the ripples is related to two factors. Firstly, the combination of ripples in quadrature gives rise to a smaller common ripple. Secondly the fictitious operation of the second rectifier at a rate which is twice as high enables the delivered signal to be filtered with double efficiency using the same filtering capacitances. The same phenomenon also takes place with respect to the reinjection of the commutation residues into the system 3.

Since the frequency of these commutations is apparently twice as high, the reinjections are dampened more efficiently by the choke impedances 25 and 26 which are made industrially for an application with a given power value. Paradoxically, with the invention, it is thus possible to obtain an even better result with double power or even with power multiplied by n than with the basic dc/ac converter. Furthermore, the reactive currents mutually compensate for one another, thus improving their performance even more. As indicated above, the invention of course has the advantage of twice using similar dc/ac converters, namely dc/ac converters that have successfully undergone the test of being produced on an industrial scale. In the final analysis, it thus becomes very easy to define a stabilized supply with a low ripple factor but with far greater power.

In practice, despite all the precautions taken when making the dc/ac converters on an industrial scale, the dc/ac converters 7 and 8 are not strictly identical. To cope with this drawback, it is proposed to duplicate the transformers such as 41 and 42 in the raising circuit. Thus two other (or n other) transformers 55 and 56 are mounted. The primary windings of these transformers 55 and 56 are parallel connected with the primary windings of the transformers 41 and 42 and their secondary windings 57 and 58 are series connected with each other. These secondary windings 57 and 58 are also connected to another second rectifying circuit, identical with the circuit 48–52. This identical second rectifier especially has two series mounted capacitors 59 and 60 at the output. It may be considered that, in parallel with the capacitors 51 and 52, there is the positive channel and that, in parallel with capacitors 59 and 60, there is a negative channel. It is then possible, by series connecting the capacitors 52 and 59, to have a mid-point which can be connected to the ground. In this way, the difficulties of electrical insulation at very high voltage are reduced. In practice, the insulating constraints are then halved.

In a standard way, a resistance divider bridge 61 and 62 is connected to X-ray tube 1 terminals. The mid-point of this bridge is connected to a comparator 63. The comparator 63 also receives a reference voltage $V_{ref}$ at a comparison input. The error signal given by the comparator 63 is introduced in a known way into a voltage/frequency converter 64 (VCO) which delivers a square signal, with a cyclical ratio of 1, to the control circuit 33. Thus, when the frequency of the voltage/frequency converter 64 varies as a function of the voltage to be regulated, the square signal (FIG. 2a) changes so as to maintain the driving quadrature phase shift of the dc/ac converters 7 and 8. A cyclical ratio of 1 corresponds to a pulse signal with a pulse duration equal to the period during which the pulse is absent. In one improvement, in order to trigger the different sets of thyristors of the dc/ac converters alternately, the frequency of the voltage/frequency converter 64 is even twice (or n times) the resonance frequency of the dc/ac converters. It then suffices to guide the triggers of the thyristors of one dc/ac converter by the rising edges of the pulse and the triggers of the thyristors of the other dc/ac converter by the descending edges of these pulses. Since the frequency is doubled from one pulse to another, it is one set of thyristors or the other that is triggered in each dc/ac converter. Logic circuits contained in the driving circuit 33, to perform this operation, are within the scope of those skilled in the art.

WHAT IS CLAIMED IS:

1. A stabilized power supply with a reduced ripple factor, especially for X-ray tubes, comprising:

a first rectifier which can be connected to an electrical mains supply, a converter circuit to convert a dc signal delivered by the first rectifier into an ac signal, said converter circuit comprising n dc/ac converter units, working at one and the same frequency and triggered with respect to each other substantially with a phase shift of $2\pi/n$, a circuit to raise the voltage of the ac signals produced by the dc/ac converter circuit, and a second circuit to rectify the ac signals whose voltages are thus raised, wherein the voltage raising circuit comprises 2n transformers being divided into a first and a second group of, each, n transformers, the primary winding of each transformer of the first group being connected in parallel with the primary winding of a corresponding transformer of the second group to the output of a dc/ac converter unit, the secondary windings of all the transformers of each group are series connected to the input of one of two second rectifiers, and wherein the two second rectifiers are series connected with each other.

2. A stabilized power supply with a reduced ripple factor, especially for X-ray tubes, comprising:

a first rectifier which can be connected to an electrical mains supply, a converter circuit to convert a dc signal delivered by the first rectifier into an ac signal, said converter circuit comprising n dc/ac double alternation type converter units, working at one and the same frequency and triggered with respect to each other substantially with a phase shift of $\pi/n$, a circuit to raise the voltage of the ac signals produced by the dc/ac converter circuit, and a second circuit rectify the ac signals whose voltages are thus raised, wherein the voltage raising circuit comprises 2n transformers, with each, its primary winding connected to an dc/ac converter unit and having a secondary windings connected in a series with the secondary windings of the other transformers to the input of the second rectifier wherein 2n primary windings are connected two by two in parallel at the output, respectively, of each of the n dc/ac converters.

3. A power supply according to claim 1 or 2 further comprising a control circuit with a voltage/frequency converter wherein the voltage/frequency converter delivers a square signal with a cyclical ratio of 1.

4. A power supply according to claim 1 or 2 wherein n equals 2.

5. A stabilized power supply with a reduced ripple factor, especially for X-ray tubes, comprising:

a first rectifier which can be connected to an electrical mains supply, a converter circuit to convert a dc signal delivered by the first rectifier into an ac signal, said converter circuit comprising n dc/ac double alternation type converter units, working at one and the same frequency and triggered with respect to each other substantially with a phase shift of $\pi/n$, a first circuit to raise the voltage of the ac signals produced by the dc/ac converter circuit, and a second circuit to rectify the ac signals whose voltages are thus raised, wherein the voltage raising circuit comprises 2n transformers being divided into a first and a second group of, each, n transformers, the primary winding of each transformer of the first group being connected in parallel with the primary winding of a corresponding transformer of the second group to the output of a dc/ac converter unit, the secondary windings of all the transformers of each group are series connected to the input of one of two second rectifiers, and wherein the two second rectifiers are series connected with each other.

* * * * *